US010551873B2

(12) United States Patent
Han et al.

(10) Patent No.: US 10,551,873 B2
(45) Date of Patent: Feb. 4, 2020

(54) DOCKING STATION FOR ELECTRONIC DEVICE

(71) Applicants: Samsung Electronics Co., Ltd., Gyeonggi-do (KR); R.F. TECH CO., LTD., Gyeonggi-do (KR)

(72) Inventors: Yong-Hwa Han, Gyeonggi-do (KR); Sang-Jun Ahn, Gyeonggi-do (KR); Chung-Keun Yoo, Gyeonggi-do (KR); Ui-Jin Lee, Gyeonggi-do (KR); Sang-Hyun Lee, Gyeonggi-do (KR)

(73) Assignees: Samsung Electronics Co., Ltd., Yeongtong-gu, Suwon-si, Gyeonggi-do (KR); R.F. Tech Co., Ltd., Wonsam-myeon, Cheoin-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 15/892,592

(22) Filed: Feb. 9, 2018

(65) Prior Publication Data

US 2018/0284842 A1    Oct. 4, 2018

(30) Foreign Application Priority Data

Mar. 28, 2017  (KR) .......................... 10-2017-0039220

(51) Int. Cl.
*G06F 1/16*        (2006.01)
(52) U.S. Cl.
CPC ................... *G06F 1/1632* (2013.01)
(58) Field of Classification Search
CPC ............................. G06F 1/1632; H04M 1/04
See application file for complete search history.

(56) References Cited

U.S. PATENT DOCUMENTS

| 5,083,290 A | * | 1/1992 | Hosoi | ................... G06F 1/1615 |
| | | | | 361/679.27 |
| 5,257,164 A | * | 10/1993 | Perez | ..................... F16M 11/10 |
| | | | | 361/679.22 |

(Continued)

FOREIGN PATENT DOCUMENTS

| GB | 2502357 A | 11/2013 |
| KR | 10-0563696 B1 | 3/2006 |

(Continued)

OTHER PUBLICATIONS

European Search Report dated Jul. 13, 2018.

*Primary Examiner* — David M Sinclair
*Assistant Examiner* — Theron S Milliser
(74) *Attorney, Agent, or Firm* — Cha & Reiter, LLC.

(57) ABSTRACT

According to various embodiments of the present disclosure, a docking station includes a base housing comprising a first surface having a recessed portion, a second surface directed in an opposite direction to the first surface, and a side surface at least partially surrounding a space between the first surface and the second surface, a slide housing slidably mounted on the recessed portion to open and close at least a part of the recessed portion, and a connection member disposed on the recessed portion, in which as the slide housing slides, the connection member is hidden or exposed, and in a state where the at least the part of the recessed portion is opened, the slide housing is positioned inclined with respect to the first surface or the second surface. The docking station described above may be implemented variously depending on embodiments.

13 Claims, 14 Drawing Sheets

(56) References Cited

U.S. PATENT DOCUMENTS

| | | | | |
|---|---|---|---|---|
| 6,264,488 B1* | 7/2001 | Helot | | G06F 1/1632 361/679.41 |
| 7,349,202 B2* | 3/2008 | Kano | | G06F 1/16 248/179.1 |
| 8,159,818 B2 | 4/2012 | Riddiford | | |
| 8,315,048 B2* | 11/2012 | Tarnoff | | G06F 1/1626 361/679.43 |
| 8,767,383 B2* | 7/2014 | Ahn | | G06F 1/1626 361/679.21 |
| 8,767,388 B2* | 7/2014 | Ahn | | F16M 11/10 361/679.27 |
| 2004/0261421 A1* | 12/2004 | McEuen | | G06F 1/1626 62/3.2 |
| 2005/0054398 A1 | 3/2005 | Kim | | |
| 2005/0163558 A1* | 7/2005 | Lee | | F16M 11/10 403/45 |
| 2006/0104018 A1* | 5/2006 | Tracy | | G06F 1/1632 361/679.41 |
| 2006/0187629 A1* | 8/2006 | Emery | | G06F 1/1613 361/679.41 |
| 2008/0089547 A1* | 4/2008 | Young | | G11B 33/124 381/386 |
| 2009/0097192 A1* | 4/2009 | Riddiford | | B60R 11/0258 361/679.01 |
| 2009/0245933 A1 | 10/2009 | Jang | | |
| 2011/0043984 A1* | 2/2011 | Byrne | | H02J 7/0044 361/679.01 |
| 2012/0275092 A1* | 11/2012 | Zhou | | F16M 13/00 361/679.01 |
| 2012/0327581 A1* | 12/2012 | Pais | | G06F 1/1632 361/679.26 |
| 2014/0098486 A1* | 4/2014 | Davis | | G06F 1/1607 361/679.41 |
| 2014/0268542 A1* | 9/2014 | Moon | | G06F 1/1632 361/679.41 |
| 2015/0331452 A1* | 11/2015 | Byrne | | G06F 1/1632 361/679.44 |
| 2016/0116942 A1* | 4/2016 | Wang | | G06F 1/1632 361/679.43 |
| 2016/0195897 A1 | 7/2016 | Robinson et al. | | |
| 2016/0360644 A1* | 12/2016 | Bains | | G06F 1/203 |

FOREIGN PATENT DOCUMENTS

| | | |
|---|---|---|
| KR | 10-1120088 B1 | 2/2012 |
| KR | 10-1566281 B1 | 10/2015 |

* cited by examiner ly mounted on the recessed portion to open and close at least a part of the recessed portion, and a connection member disposed on the recessed portion, in which as the slide housing slides, the connection member is hidden or exposed, and in a state where the at least the part of the recessed portion is opened, the slide housing is positioned inclined with respect to the first surface or the second surface.
DOCKING STATION FOR ELECTRONIC DEVICE

CLAIM OF PRIORITY

This application claims the benefit under 35 U.S.C. § 119(a) of a Korean patent application filed in the Korean Intellectual Property Office on Mar. 28, 2017 and assigned Serial No. 10-2017-0039220, the entire disclosure of which is incorporated herein by reference in its entirety for all purposes.

TECHNICAL FIELD

Various embodiments of the present disclosure relate to an electronic device, for example, an electronic device (e.g., a docking station) used for cradling or expanding the capabilities of another electronic device.

BACKGROUND

With the common use of electronic devices carried by individuals, such as mobile communication terminals, various types of communication protocols using the electronic devices have been implemented. Such personal electronic devices allow users to use network connection or multimedia functions while the users move. With the recent improvement in capabilities of electronic devices (e.g., data processing speed, display quality, audio quality, etc.), electronic devices such as smart phones or tablet PCs, etc., have become alternatives to other traditional electronic devices such as desktop personal computers (PCs), video/audio appliances, and so forth.

Although the electronic devices such as smart phones or tablet PCs, etc. are capable of processing high-quality images or audio, the screen size or audio volume implemented by a display or a speaker therein may be limited.

The above information is presented as background information only to assist with an understanding of the present disclosure. No determination has been made, and no assertion is made, as to whether any of the above might be applicable as prior art with regard to the present disclosure.

SUMMARY

Various embodiments of the present disclosure provide an electronic device, e.g., a docking station, which has an elegant exterior and is easy to carry.

According to various embodiments of the present disclosure, a docking station includes a base housing including a first surface having a recessed portion, a second surface directed in an opposite direction to the first surface, and a side surface at least partially surrounding a space between the first surface and the second surface, a slide housing slidably mounted on the recessed portion to open and close at least a part of the recessed portion, and a connection member disposed on the recessed portion, in which as the slide housing slides, the connection member is hidden or exposed, and in a state where the at least the part of the recessed portion is opened, the slide housing is positioned inclined with respect to the first surface or the second surface.

According to various embodiments of the present disclosure, an electronic device includes a base housing including a lower structure, a side structure, and a recessed portion at least partially surrounded by the lower structure and the side structure so as to be opened substantially upwardly, in which a part of the recessed portion has a shape and a size for receiving a part of a first external electronic device including a first connector, a male electrical connector disposed on the recessed portion, and aligned and disposed in a first direction so as to connect to the first connector when the first external electronic device is received in the recessed portion, a slide housing directly or indirectly connected to the base housing and moving between a position in which the recessed portion is closed on the base housing, thereby having a closed state and a position in which the part of the recessed portion is opened to support the first external electronic device received in the recessed portion by positioning a surface of the slide housing toward a second direction substantially perpendicular to the first direction, thereby having an opened state, a female electrical connector disposed on an external surface of the side structure of the base housing, and a circuit electrically connecting the male electrical connector with the female electrical connector, in which the circuit is configured to provide an image signal, which is received from the first external electronic device through the male electrical connector, to an outside of the electronic device through the female electrical connector.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
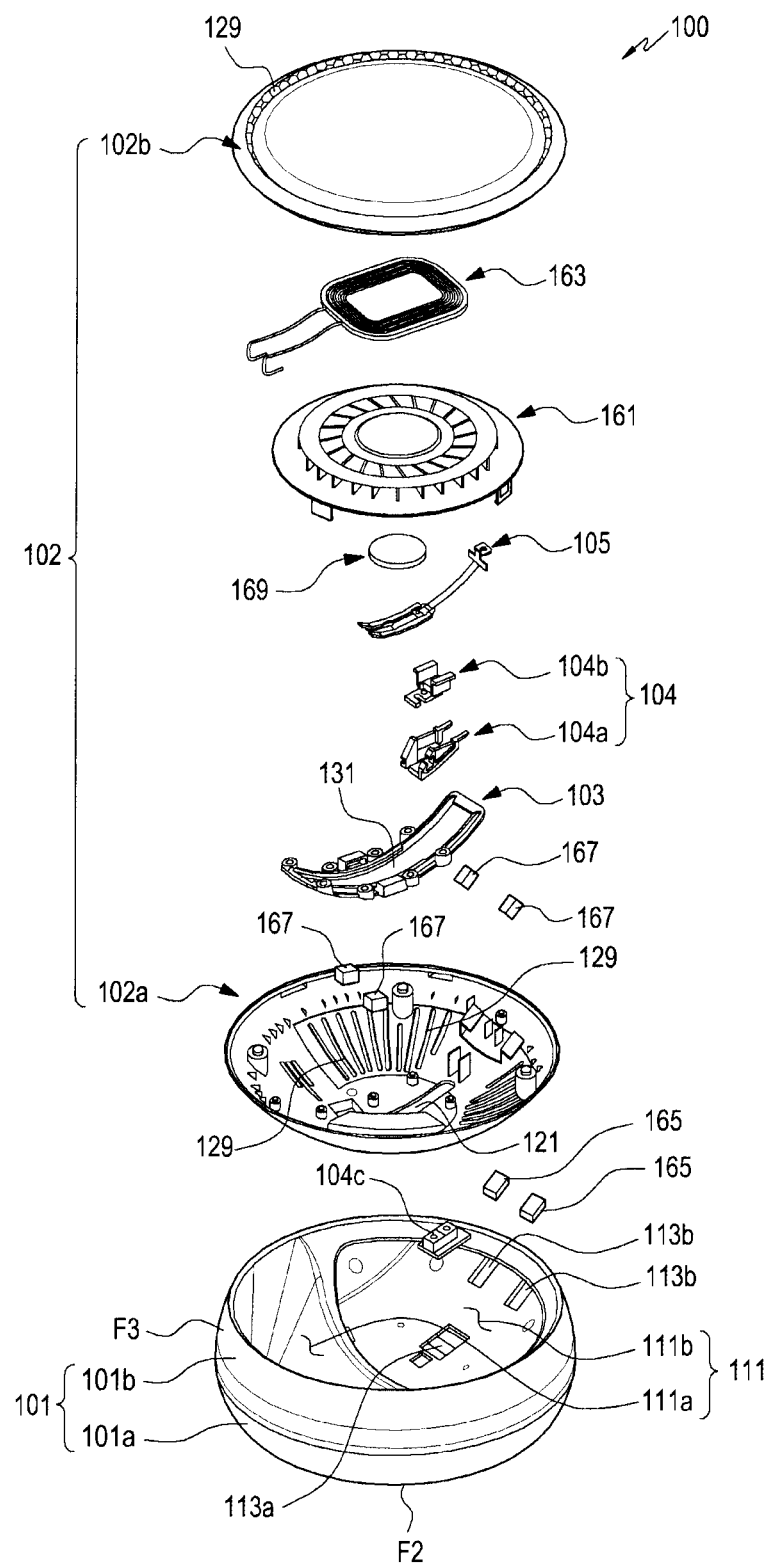
FIG. 1 is an exploded perspective view of a docking station according to various embodiments of the present disclosure.

Various changes may be made to the present disclosure and the present disclosure may have various embodiments which will be described in detail with reference to the drawings. However, the embodiments according to the concept of the present disclosure are not construed as limited to specified disclosures, and include all changes, equivalents, or substitutes that do not depart from the spirit and technical scope of the present disclosure.

Although ordinal numbers such as "first", "second", and so forth will be used to describe various components of the present disclosure, those components are not limited by the terms. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

Relative terms used based on illustration in the drawings, such as a "front side", a "rear side", a "top surface", a "bottom surface", and the like, may be replaced with ordinal numbers such as "first", "second", and the like. The order of the ordinal numbers such as "first", "second", and the like is a mentioned order or an arbitrarily set order, and may be changed as needed.

The terms used in the present disclosure are for the purpose of describing particular exemplary embodiments only and are not intended to be limiting. The singular forms are intended to include the plural forms as well, unless the context clearly indicates otherwise. The term "include" or "has" used in the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having meanings that are the same as or similar with the contextual meanings of the relevant technology and should not be interpreted as having ideal or exaggerated meanings unless they are clearly defined in the present disclosure.

In various embodiments of the present disclosure, an electronic device may be an arbitrary device having a touch panel and may be referred to as a terminal, a portable terminal, a mobile terminal, a communication terminal, a portable communication terminal, a portable mobile terminal, a display, or the like.

For example, the electronic device may be a smart phone, a cellular phone, a navigation device, a game console, a television (TV), a vehicle head unit, a laptop computer, a tablet computer, a personal media player (PMP), a personal digital assistant (PDA), or the like. The electronic device may be implemented with a pocket-size portable communication terminal having a wireless communication function. The electronic device may be a flexible device or a flexible display.

The electronic device may communicate with an external electronic device such as a server or may work by cooperating with the external electronic device. For example, the electronic device may transmit an image captured by a camera and/or position information detected by a sensor unit to the server over a network. The network may include, but not limited to, a mobile or cellular communication network, a local area network (LAN), a wireless LAN (WLAN), a wide area network (WAN), Internet, a small area network (SAN), etc.

It shall be understood that this detailed description describes some embodiments. Therefore, it shall further be understood that statements made herein with respect to an embodiment is applicable to that embodiment, but may not be applicable to other embodiments.

Enhancing Capabilities of an External Electronic Device

Figure 2:
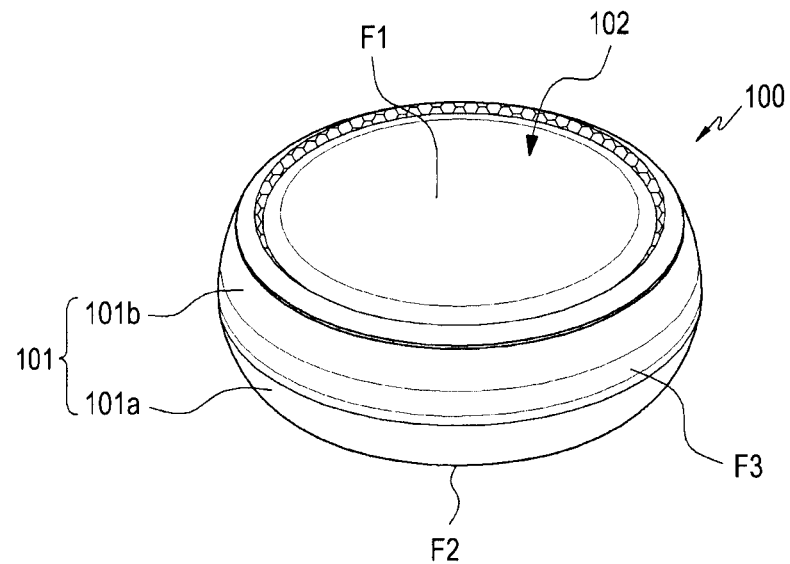
FIG. 2 is a perspective view of a docking station according to various embodiments of the present disclosure.
Figure 3:
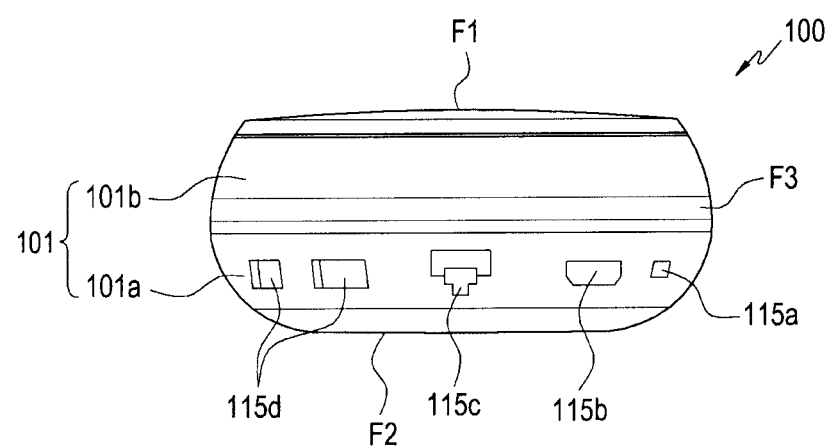
FIG. 3 is a side view of a docking station according to various embodiments of the present disclosure.

FIG. 1 is an exploded perspective view of a docking station 100 according to various embodiments of the present disclosure. FIG. 2 is a perspective view of the docking station 100 according to various embodiments of the present disclosure. FIG. 3 is a side view of the docking station 100 according to various embodiments of the present disclosure.

The docking station 100 may allows receipt and connection of an external electronic device, such as, but not limited to, a mobile communication terminal via a first connection member. The docking station 100 may also receive cable(s) via second connection member(s). The cable(s) can include power cables, HDMI cables, Ethernet cables, USB cables, etc. The cables connect the docking station 100 to an additional device, such as a power outlet (power cable), display (HDMI cable), a wired network (Ethernet cable), other input/output device (USB cable). The first connection member and the second connection member(s) are connected by a circuit device, such as a PCB. As a result, a mobile communication terminal connected to the first connection member communicatively connected to the additional device, e.g., the power outlet, display, wired network, other input/output device, etc.

Referring to FIGS. 1 through 3, an electronic device according to various embodiments of the present disclosure, for example, the docking station 100 receives an external electronic device (e.g., an electronic device 10 of FIG. 5) on a base housing 101 thereof, and connects the cradled electronic device to another additional device or a network. The docking station 100 shall be understood to receive an external electronic device (such as electronic device 10 of FIG. 5), embodiments will be described where the external electronic device is a mobile communication device, with the understanding the present disclosure is not limited to a mobile communication device. For example, the docking station 100 may include a power cable to supply power to the received electronic device, a high definition multimedia interface (HDMI) cable for connection to image appliances such as a monitor, a TV, etc., an Ethernet cable to enable connection with a wired network, and a universal serial bus (USB) cable to provide connection with various input/output devices or storage devices, etc. The base housing 101 may include a male electrical connector and a plurality of female connectors. The male connector, or first connection member, can be for connection with an external electronic device. The plurality of female electrical connectors, or second connection members, can be for connection with another additional device, such as an input/output device. The first connection member and second connection members are connected by a circuit or a circuit device (e.g., a printed circuit board (PCB)). Thus, the external electronic device connected to the first connection member forms an electrical connection with additional devices that are connected to the second connection members. The structure of the base housing 101 will later be described in more detail with reference to FIG. 4.

According to various embodiments, the base housing 101 may be formed by coupling a lower case 101a and an upper case 101b. The base housing 101 may include a first surface F1, a second surface F2 (e.g., a lower structure) opposite to the first surface F1, and a side surface F3 (e.g., a side structure) at least partially surrounding a space between the first surface F1 and the second surface F2. According to an embodiment, the base housing 101 may include the lower case 101a and the upper case 101b. In an embodiment, the lower structure (e.g., the second surface F2) may be a part of the lower case 101a, and the side structure (e.g., the side surface F3) may be formed by coupling another part of the lower case 101a and a part of the upper case 101b.

According to various embodiments, in at least a partial region of the upper case 101b, e.g., under the first surface F1, may be formed by a recessed portion 111 in a dented shape (wherein the recess is lower towards the center and higher near the periphery). For example, the recessed portion 111 may be substantially upwardly opened on the first surface F1, and may be formed and disposed in such a way to be at least partially surrounded by the lower structure (e.g., the second surface F1) and the side structure (e.g., the side surface F3). In a detailed embodiment of the present disclosure, the base housing 101 is illustrated as cylindrical or a circular truncated conical shape, but the present disclosure is not limited to this example. For example, the first surface F1 or the second surface F2 of the base housing 101 may have a polygonal shape. The side surface F3 is illustrated as a convex shape, but may also have a planar or concave shape.

According to various embodiments, an outer side surface, e.g., the side surface F3, of the base housing 101 may be provided with at least one connection hole(s) 115a, 115b, 115c, and 115d. The connection hole(s) 115a, 115b, 115c, and 115d may be provided to receive, for example, a power cable, an HDMI cable, an Ethernet cable, a USB cable, etc., and second connection members (e.g., second connection members 117a, 117b, 117c, and 117d of FIG. 4) corresponding thereto, respectively, may be disposed inside the base housing 101.

In an embodiment, the recessed portion 111 may include a cradling recess 111a and a receiving recess 111b. The cradling recess 111a formed as a part of the recessed portion 111 provides a space for mounting a mobile communication device, and may have a size and a shape forming a reverse negative impression of a part of the mobile communication device. For example, the mobile communication device may be put on the base housing 101 by being mounted on the cradling recess 111a. In an embodiment, the cradling recess 111a may be provided with a male electrical connector, e.g., a connection member (e.g., a first connection member 117e of FIG. 4 or 6) connected with the electronic device. The connection member may be, for example, a cable complying with USB type C standards, and may be connected with other connection member(s) (e.g., second connection members 117a, 117b, 117c, and 117d of FIG. 4) through a circuit or circuit device (e.g., a PCB) embedded in the base housing 101. For example, the base housing 101 may connect the mobile communication device put on the cradling recess 111a with an image appliance such as a monitor, a TV, etc., with an external power source or a network (e.g., a wired network such as a LAN, etc.), or with an input/output device such as a keyboard, a mouse, etc., or an external storage device.

Slide Housing Cover

The docking station 100 may include a cover formed by a slide housing 102 for concealing the first connection member when the device is not in use, and exposing the first connection member when the device is in use. The slide housing 102 may prevent exposure of the connection member when the docking station 100 is not in use. When the device is not in use, the slide housing 102 may be in a position that causes the docking station 100 to adopt a rather global cylindrical shape. Among other things, this facilitates packaging, allowing placement of the docking station 100 into a considerably smaller rectangular box. When the slide housing 102 is positioned to expose the connection member, the cover may support a connected mobile communication device, thereby reducing stress on the connection member.

According to various embodiments, the docking station 100 may further include a slide housing 102. The slide housing 102 is slidably mounted on the recessed portion 111, e.g., the receiving recess 111b, to open or close at least a part of the recessed portion 111, e.g., the cradling recess 111a. According to an embodiment, the receiving recess 111b may include a curved surface having a specific curvature, and the slide housing 102 may slide along a curved trajectory corresponding to the shape of the curved surface of the receiving recess 111b by being guided by the recessed portion 111 or the like. For example, the slide housing 102 may slide between a closed position (e.g., in which the slide housing 102 is received in the recessed portion 111 in such a way to close the recessed portion 111, or an outer side surface of the slide housing 102 is stopped to become a part of the first surface F1) and an opened position (e.g., in which the slide housing 102 is inclined with respect to the first surface F1 or the second surface F2). Once the slide housing 102 is received in the recessed portion 111, a part of an outer circumferential surface of the slide housing 102 may be positioned in or on the first surface F1. For example, the slide housing 102 may be received in the recessed portion 111 to close the recessed portion 111 (e.g., the cradling recess 111a), and may form a planar top surface, e.g., the first surface F1, in a planar manner on the base housing 101. In an embodiment, a part of the recessed portion 111 (e.g., the cradling recess 111a) may be opened in the opened position. For example, in a state where the slide housing 102 is positioned inclined, the mobile communication device may be received on the base housing 101 (e.g., the cradling recess 111a) via connection to the first connection member 117e. In another embodiment, the slide housing 102 may be disposed to support a surface of the mobile communication device received by the base housing 101 via connection to the connection member. Supporting the surface of the mobile communication device reduces lateral stress between the first connection member 117e and the portion of the mobile communication device that forms the connection to the first connection member 117e.

According to various embodiments, the slide housing 102 may include a curved case 102a and a planar case 102b. In an embodiment, the curved case 102a is disposed to face the recessed portion 111, and may include a curved surface corresponding to the curvature (or the curved surface) of the receiving recess 111b. For example, the curved case 102a may be formed to correspond to a shape of the receiving recess 111b, and may slide along the curved trajectory by being guided by the receiving recess 111b. In another embodiment, the planar case 102b may be coupled with the curved case 102a, and may be positioned on the first surface F1 or inclinedly with respect to the first surface F1 (or the second surface F2) along with sliding of the slide housing 102. According to an embodiment, an alignment direction of the connection member disposed in the cradling recess 111a may be substantially perpendicular to a direction which the planar case 102b (e.g., the outer side surface) faces in the opened position. In another embodiment, when the slide housing 102 is in the opened position, the alignment direction of the connection member disposed in the cradling recess 111a may be substantially parallel to a direction in which the planar case 102b is inclined with respect to the first surface F1. For example, once an mobile communication device is received and disposed in the cradling recess 111a, a surface (e.g., a back surface) of the electronic device 10 may be supported on the planar case 102b and a connector disposed on another surface (e.g., a lower-end surface) of the electronic device 10 may be coupled with the connection member provided on the cradling recess 111a.

According to various embodiments, the docking station 100 may include a guide rail 103 and a guide member 104 to couple the slide housing 102 to the base housing 101 in such a way that the slide housing 102 may slide. The guide rail 103 is mounted on the slide housing 102 and may include a first guide slot 131. The first guide slot 131 may have an arc shape having a curvature corresponding to the curved surface of the receiving recess 111b. The guide rail 103 is mounted on the slide housing 102, e.g., an inner side surface of the curved case 102a, and the curved case 102a may include a second guide slot 121 corresponding to the first guide slot 131. For example, once the guide rail 103 is mounted on the curved case 102a, the first guide slot 131 and the second guide slot 121 may form one slot. Hereinbelow, the slot formed by a combination of the first guide slot 131 and the second guide slot 121 in a state where the guide rail 103 is mounted on the curved case 102a will be referred to as a 'guide slot', and when the first guide slot 131 and the second guide slot 121 need to be distinguished from each other, reference numerals will be used for description.

According to various embodiments, the guide member 104 is fixed to the base housing 101 and may include a friction member 104a, a first fixing member 104b, or a second fixing member 104c. The friction member 104a is slidably bound to, for example, the guide rail 103, and the first fixing member 104b and the second fixing member 104c may provide a means for fixing the friction member 104a to the base housing 101. According to an embodiment, the guide rail 103 and the friction member 104a are directly rubbed together in sliding of the slide housing 102, and may be made of synthetic resin having superior fatigue resistance, wear resistance, mechanical strength, lubricity, etc. (e.g., acetal resin (poly oxy methylene (POM)). According to another embodiment, acetal resin may be used in directly contacting and rubbing portions between the base housing 101 and the slide housing 102 to prevent a damage of an exterior and to facilitate sliding.

In an embodiment, the first fixing member 104b is coupled to surround a part of the friction member 104a, and the second fixing member 104c is directly mounted on the base housing 101. To mount the second fixing member 104c, a first fixing groove 113a may be formed in the base housing 101, e.g., the receiving recess 111b. For example, the second fixing member 104c may be mounted in the first fixing groove 113a, and the first fixing member 104b and the friction member 104a may be disposed substantially in the slide housing 102 or the guide slot (e.g., the first guide slot 131 and the second guide slot 121) and may be engaged to the first fixing member 104c through an engagement member such as a screw, etc.

In an embodiment, the docking station 100 may further include a cover member 105 disposed in the slide housing 102. The cover member 105 opens or closes a part of the guide slot (e.g., the first guide slot 131 and the second guide slot 121) along sliding of the slide housing 102 (or a position of the slide housing 102 with respect to the base housing 101). The structure and operation of the cover member 105 will later be described in more detail with reference to FIG. 13.

According to various embodiments, the docking station 100 may further include magnetic materials 165 and 167 disposed on the base housing 101 and the slide housing 102, respectively. For example, the base housing 101 may include a second fixing groove(s) 113b formed on the receiving recess 111b, and a first magnetic material(s) 165 may be disposed on the second fixing groove(s) 113b. A plurality of second magnetic materials 167 are disposed on the slide housing 102, e.g., on the inner side surface of the curved case 102a. For example, the second magnetic materials 167 may be disposed adjacent to opposite end portions of the trajectory of the first guide slot 131, respectively. According to an embodiment, when the slide housing 102 reaches a specific position(s), the first magnetic material 165 may be disposed adjacent to some of the second magnetic materials 167. The first magnetic material 165 causes an attractive force with the adjacent some of the second magnetic materials 167, thereby suppressing movement of the slide housing 102 with respect to the base housing 101. For example, in the closed position and/or the opened position, the first magnetic material 165 may be disposed adjacent to some of the second magnetic materials 167.

According to various embodiments, various electric part(s) may be mounted on the slide housing 102. For example, a cooling pan 161, a loop antenna 163, etc., may be mounted on the slide housing 102. In an embodiment, the cooling fan 161 may suppress or alleviate heat emission of the received mobile communication device, and the loop antenna 163 may set up communication between the docking station 100 and the received mobile communication device. In an embodiment, the loop antenna 163 may be used for wireless power transmission, and if the received mobile communication device has a wireless charging function, the mobile communication device may be provided with charging power, etc., via the loop antenna 163. According to an embodiment, the wireless charging function may be provided even in a state where the slide housing 102 closes the recessed portion 111. For example, even in the closed position, once the mobile communication device having a wireless charging inductor is placed on the first surface F1 or the slide housing 102, the loop antenna 163 may wirelessly transmit power.

In another embodiment, a speaker 169 may be mounted on the slide housing 102, and may be provided with an audio signal from the mobile communication device through the connection member 117e provided on the cradling recess 111a or the loop antenna 163, etc. For example, the speaker 169 may be provided with an audio signal from the electronic device in a wired manner through the connection member provided on the cradling recess 111a or in a Bluetooth communication manner through the loop antenna 163. In an embodiment, if a cooling fan (e.g., the cooling fan 161), the speaker 169, and so forth are mounted in the slide housing 102, vent holes 129 for air flow or audio output may be provided. For example, in the curved case 102a and/or the planar case 102b may be formed a plurality of through-holes for facilitating the air flow or the audio output. While the through-holes for the flow of air or the output of audio have been collectively referred to 'vent holes' in the description of a detailed embodiment of the present disclosure, the through-holes formed in the curved case 102a for the air flow may be formed as holes for introducing the air and in this case, the through-holes formed in the planar case 102b may be formed as holes for discharging the air. In an embodiment, the vent holes formed in the curved case 102a may be formed as holes for discharging the air, and the vent holes formed in the planar case 102b may be formed as holes for introducing the air.

According to various embodiments, electric part(s) mounted on the slide housing 102 may be electrically connected with a PCB (e.g., a PCB 117 of FIG. 4) embedded in the base housing 101. Although not shown, the guide member 104 may provide an interconnection path (e.g., a through-hole 143 of FIG. 11), and through the interconnection path, a wire, a flexible PCB, a ribbon cable, and the like are interconnected to connect the electric part(s) to the PCB embedded in the base housing 101. In an embodiment, in sliding of the slide housing 102, the guide member 104 may protect the wire, and the like from a damage.

Figure 4:
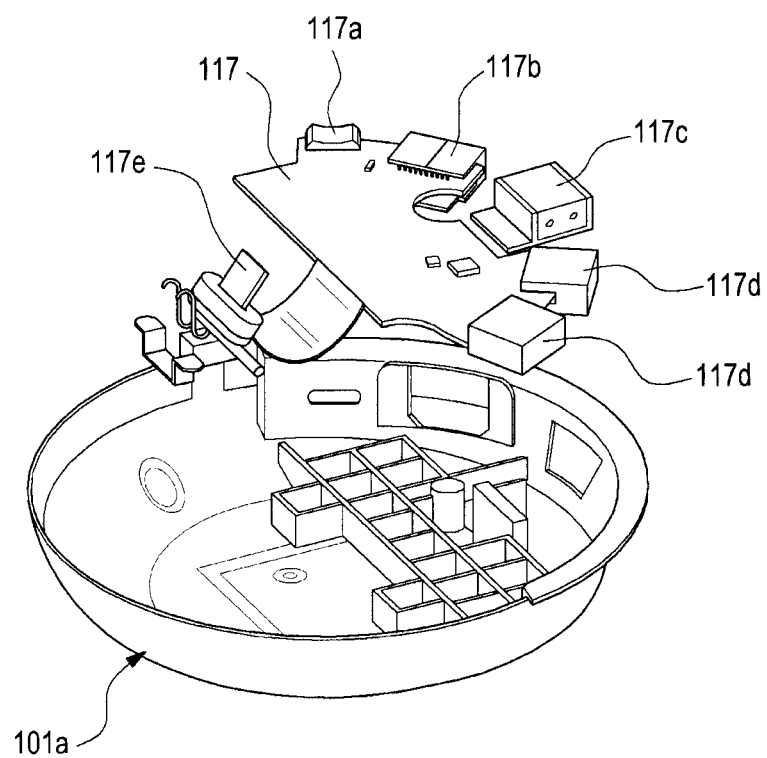
FIG. 4 is an exploded perspective view of a part of a base housing of a docking station according to various embodiments of the present disclosure.

FIG. 4 is an exploded perspective view of a part of the base housing 101 of the docking station 100 according to various embodiments of the present disclosure.

Referring to FIG. 4, a circuit or a circuit device (e.g., the PCB 117) may be disposed in the base housing 101, e.g., the lower case 101a. The PCB 117 is connected with the first connection member 117e disposed in the cradling recess 111a, and may include at least one, e.g., the plurality of second connection members 117a, 117b, 117c, and 117d. For example, the second connection members 117a, 117b, 117c, and 117d may be, for example, female electrical connectors, be mounted on the PCB 117, and be disposed to correspond to any one of connection holes (e.g., the connection holes 115a, 115b, 115c, and 115d of FIG. 3) in the base housing 101.

According to various embodiments, the PCB 117 electrically connects the first connection member 117e to at least one of the second connection members 117a, 117b, 117c, and 117d. According to an embodiment, any one of the second connection members (e.g., the second connection member 117a) is a power connector, and may be connected with the first connection member 117e through a power module. For example, the PCB 117 may include the power module.

According to another embodiment, any another of the second connection members (e.g., the second connection member 117b) is an HDMI connector, and may be connected with the first connection member 117e through a signal processing module (e.g., a processor). For example, the first connection member 117e is a connector complying with the USB type c standards, and the signal processing module may be provided in the PCB 117 to convert and relay a signal between an USB type C connector and the HDMI connector. The PCB 117 may receive an image signal from the mobile communication device through the first connection member 117e (e.g., the male electrical connector) and provide the received image signal to an external device (e.g., another electronic device) through the second connection member (e.g., the HDMI connector). According to another embodiment, any another of the second connection members (e.g., the second connection member 117c) is an Ethernet connector, and may be connected with the first connection member 117e through another signal processing module (e.g., a communication module). For example, the PCB 117 may be provided with a plurality of signal processing modules to convert and relay a signal between the HDMI connector and the first connection member 117e or between the Ethernet connector and the first connection member 117e. According to another embodiment, at least one of the second connection members (e.g., the second connection member 117d) may include a USB connector. The USB connector(s) may be connected with the first connection member 117e through another signal processing module.

According to various embodiments, the power module and the signal processing module(s), etc., provided on the PCB 117 may include one integrated circuit (IC) chip. The PCB 117 (or the IC chip mounted on the PCB 117) processes power or data and provides the power or data to the mobile communication device received by the docking station 100, thereby reducing a load of the electronic device (e.g., a load caused by management of the power provided through the first connection member 117e or by data processing, etc.).

Figure 5:
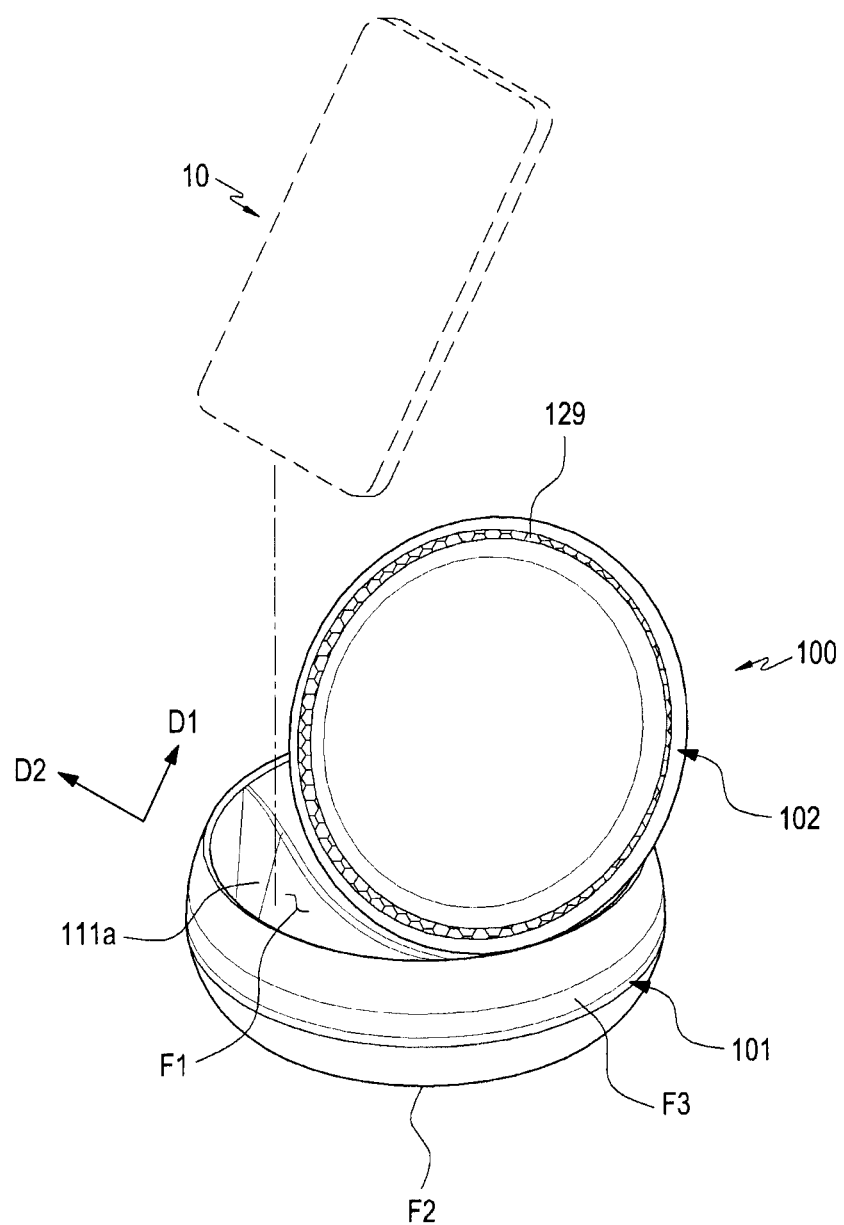
FIG. 5 is a perspective view showing a state where a slide housing of a docking station moves according to various embodiments of the present disclosure.
Figure 6:
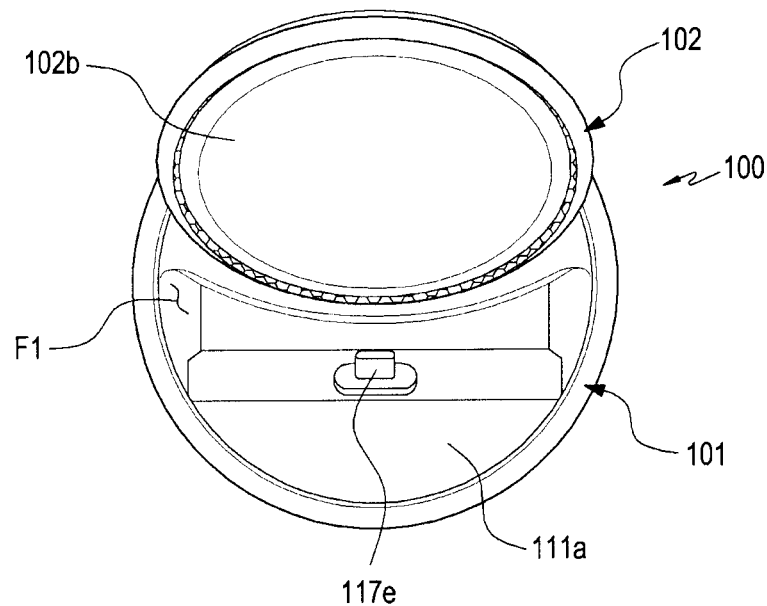
FIG. 6 is a plan view showing a state where a slide housing of a docking station moves according to various embodiments of the present disclosure.
Figure 7:
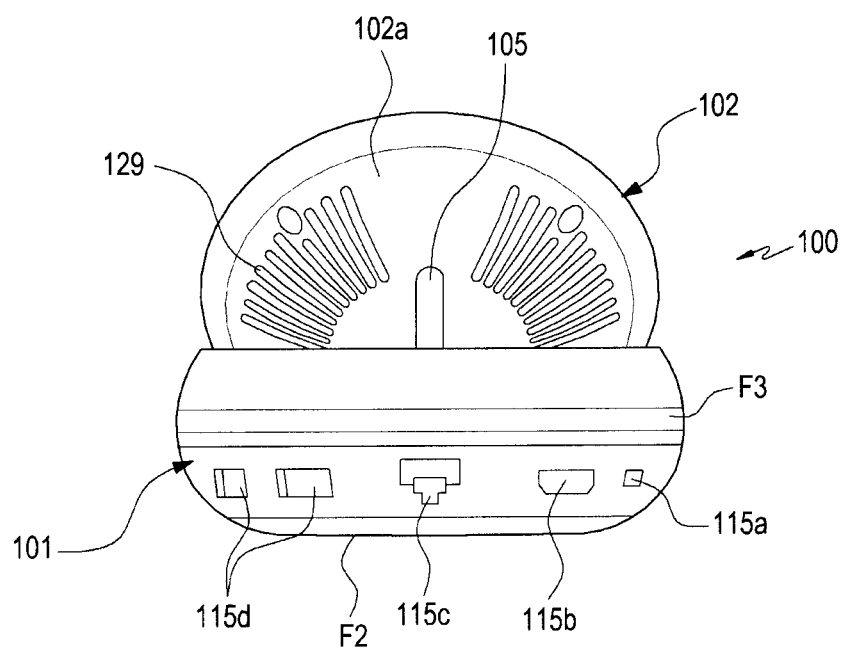
FIG. 7 is a side view showing a state where a slide housing of a docking station moves according to various embodiments of the present disclosure.

FIG. 5 is a perspective view showing a state where the slide housing 102 of the docking station 100 moves according to various embodiments of the present disclosure. FIG. 6 is a plan view showing a state where the slide housing 102 of the docking station 100 moves according to various embodiments of the present disclosure. FIG. 7 is a side view showing a state where the slide housing 102 of the docking station 100 moves according to various embodiments of the present disclosure.

Open Position of Slide Housing and Receipt of External Electronic Device

Referring to FIGS. 5 through 7, in the opened position (e.g., in the position where the slide housing 102 and/or the planar case 102b are positioned inclined with respect to the first surface F1 and/or the second surface F2), a part of a recessed portion (e.g., the recessed portion 111 of FIG. 1), e.g., the cradling recess 111a may be opened. The first connection member 117e disposed in the cradling recess 111a is aligned in a first direction D1 inclined with respect to the first surface F1 and/or the second surface F2 of the base housing 101. According to an embodiment, the first direction D1 may be substantially parallel with a direction in which the planar case 102b is inclined with respect to the first surface F1 and/or the second surface F2. According to another embodiment, in the opened position, a second direction D2 which one surface of the slide housing 102, e.g., an outer side surface of the planar case 102b faces may be substantially perpendicular to the first direction D1. An external electronic device 10 can be received by the docking station 100. The external electronic device 10 can include a variety of electronic devices, such as a mobile communication device or a tablet, to name a few. The external electronic device 10 shall now be referred to as a mobile communication device with the understanding that the disclosure is not limited to a mobile communication device.

According to various embodiments, once mobile communication device 10 is received by the base housing 101, e.g., the cradling recess 111a, a connector, such as a USB port of the mobile communication device 10 is coupled to the first connection member 117e, and one surface of the slide housing 102 (e.g., the outer side surface of the planar case 102b) supports one surface of the mobile communication device 10. If the cooling fan (e.g., the cooling fan 161 of FIG. 1) operates in a state where the mobile communication device 10 is put on the base housing 101, the air flows through the vent holes 129 formed in the curved case 102a and the planar case 102b, thus cooling the electronic device 10.

According to various embodiments, as shown in FIG. 7, in the opened position, the cover member (e.g., the cover member 105 of FIG. 1) closes the guide slot (e.g., the second guide slot 121 of FIG. 1) to prevent introduction of foreign substances or the like. According to an embodiment, the cover member 105 partially closes the guide slot 121 of the curved case 102a to provide a path for allowing the air flow, while blocking introduction of foreign substances. For example, similarly with the air flow formed in the vent holes 129, the cover member 105 may allow the air flow.

Fixing the Position of the Slide Housing

Figure 8:
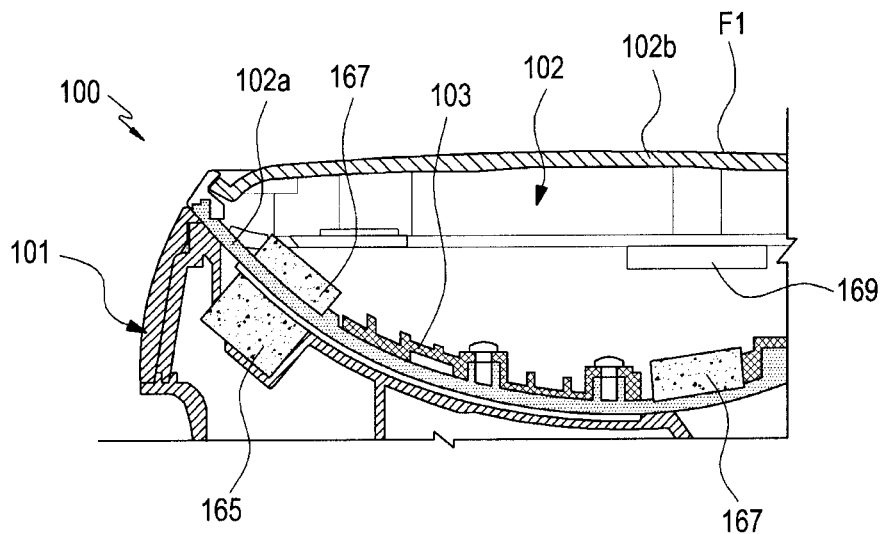
FIG. 8 and FIG. 9 are cross-sectional views of parts cut from a docking station according to various embodiments of the present disclosure.
Figure 9:
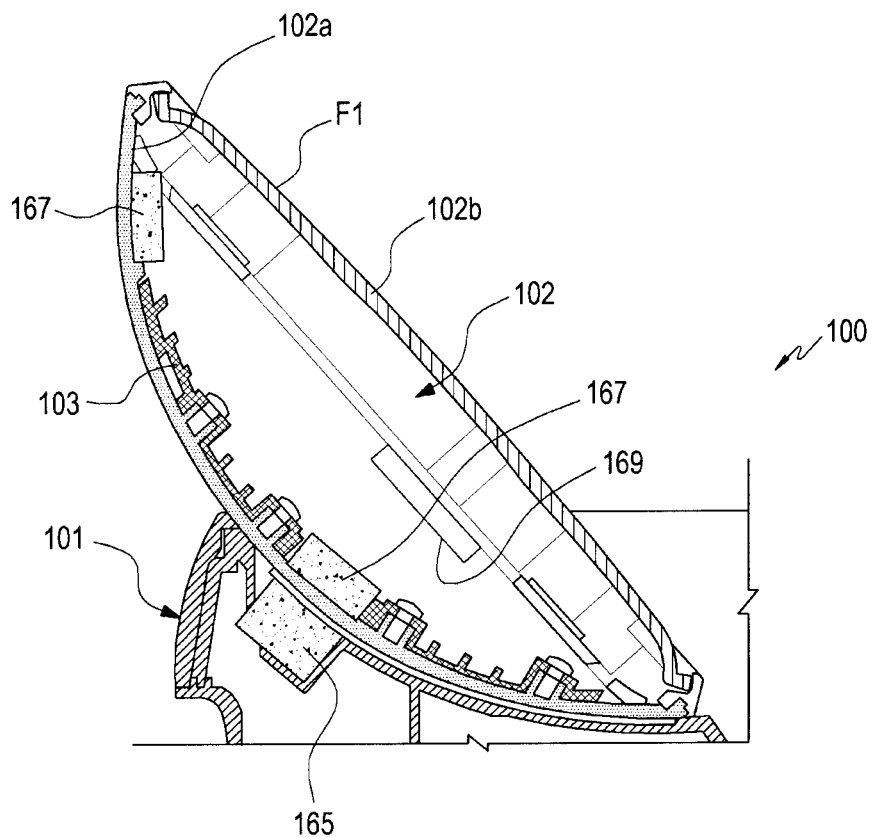

FIGS. 8 and 9 are cross-sectional views of the docking station 100 according to various embodiments of the present disclosure.

Referring to FIGS. 8 and 9 together with FIG. 1, a pair of first magnetic materials 165 may be disposed on the base housing 101 and two pairs of second magnetic materials 167 may be disposed on the slide housing 102. The first magnetic materials 165 may be mounted in the second fixing groove 113b provided in the receiving recess 111b. The second magnetic materials 167 are mounted on the inner side surface of the curved case 102a, and may be disposed in opposite end portions of a sliding section of the slide housing 102, e.g., in opposite end portions of the guide rail 103.

According to various embodiments, in the closed position, for example, in a state where the slide housing 102 closes the recessed portion 111 as shown in FIG. 8, some of the second magnetic materials 167 may be disposed adjacent to the first magnetic material 165 to cause an attractive force. For example, in the closed position, some of the second magnetic materials 167 may fix the slide housing 102 together with the first magnetic material 165 or suppress unnecessary movement of the slide housing 102.

According to various embodiments, in the opened position, for example, in a state where the slide housing 102 opens the recessed portion 111 (e.g., the cradling recess 111a of FIG. 5) as shown in FIG. 9, the others of the second magnetic materials 167 may be disposed adjacent to the first magnetic material 165 to cause an attractive force. For example, in the opened position, the others of the second magnetic materials 167 may fix the slide housing 102 together with the first magnetic material 165 or suppress unnecessary movement of the slide housing 102.

Figure 10:
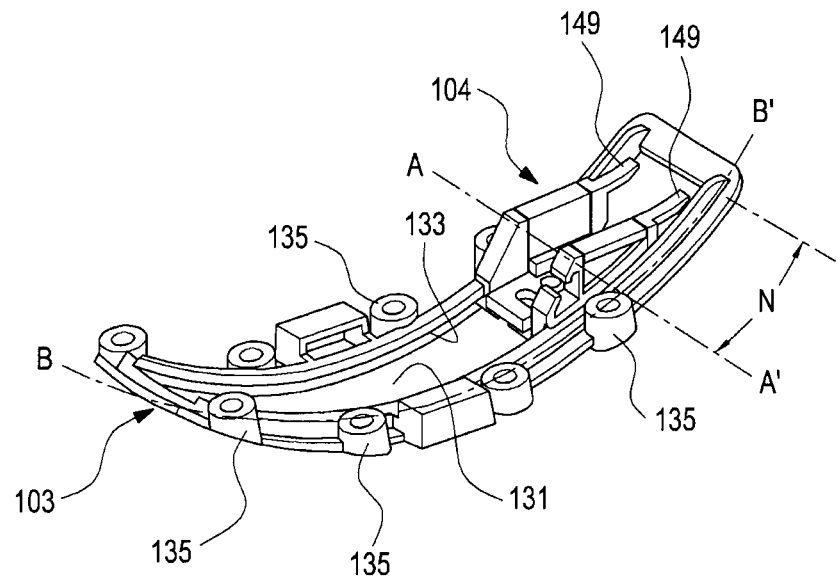
FIG. 10 is a perspective view of a slide structure of a docking station according to various embodiments of the present disclosure.
Figure 11:
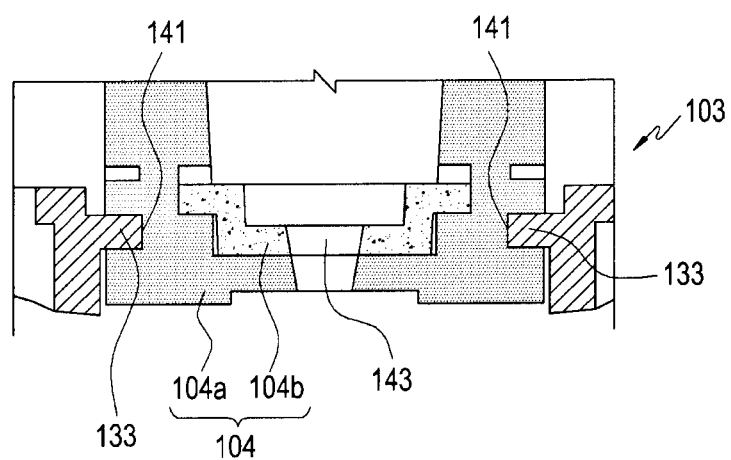
FIG. 11 is a cross-sectional view of a slide structure cut along a line A-A' of FIG. 10 according to various embodiments of the present disclosure.
Figure 12:
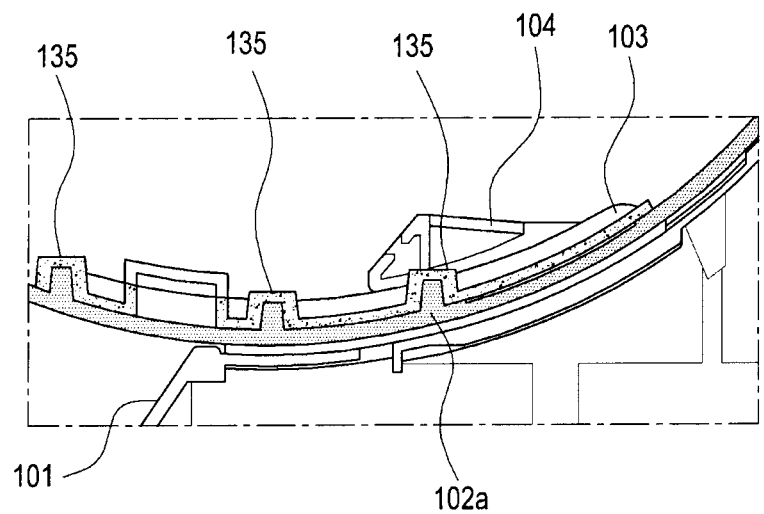
FIG. 12 is a cross-sectional view of a slide structure cut along a line B-B' of FIG. 10 according to various embodiments of the present disclosure.

FIG. 10 is a perspective view of a slide structure of the docking station 100 according to various embodiments of the present disclosure. FIG. 11 is a cross-sectional view of a slide structure cut along a line A-A' of FIG. 10 according to various embodiments of the present disclosure. FIG. 12 is a cross-sectional view of a slide structure cut along a line B-B' of FIG. 10 according to various embodiments of the present disclosure.

Referring to FIGS. 10 through 12, a slide structure using the guide rail 103 and the guide member 104 will be described in more detail.

According to various embodiments, the guide rail 103 has a globally frame shape, and may include the first guide slot 131 extending along the circular arc trajectory. The guide rail 103 may include guide rib(s) 133 formed on an inner wall. The guide rib(s) 133 protrude in a direction close to each other on opposite inner walls, and extend along the trajectory of the first guide slot 131. According to an embodiment, the guide rib 133 may not be formed in a partial section of the first guide slot 131 (hereinafter, an 'assembly section N'). For example, the guide rib 133 may be formed in a partial section of the trajectory along which the first guide slot 131 extends. The assembly section N may provide a space for coupling the guide member 104 to the guide rail 103. In an embodiment, the guide rail 103 may include engagement boss(es) 135 formed on an outer side surface thereof, thus being mounted and fixed onto the inner side surface of the curved case 102a.

According to various embodiments, the guide member 104 may include the friction member 104a and the first fixing member 104b. The first fixing member 104b is coupled to surround a part of an outer side surface of the friction member 104a, and may be made of a metallic material, e.g., a zinc (Zn) material. The friction member 104a may include guide grooves 141 formed on opposite outer side surfaces thereof. The guide groove 141 may be engaged with the guide rib 133 to substantially guide sliding of the guide rail 103 and/or the slide housing 102. For example, the guide rail 103 and/or the slide housing 102 may move along the curved trajectory by being guided by the guide rib 133 and the guide groove 141. In an embodiment, the guide member 104 may include a first interfering piece 149 formed on the friction member 104a. The structure of the first interfering piece 149 will later be described with reference to FIG. 13.

According to an embodiment, the friction member 104a enters the first guide slot 131 through the assembly section N, such that the guide groove 141 is aligned with the guide rib 133. For example, the friction member 104a may enter the first guide slot 131 through the assembly section N and then move the trajectory along which the first guide slot 131 extends, such that the guide groove 141 is assembled to receive the guide rib 133. In an embodiment, in a state where the guide rail 103 is mounted on the curved case 102a, the entrance of the friction member 104a into the assembly section N may be limited. In an embodiment, the inner side surface of the curved case 102a may be provided with a dummy (e.g., an interfering protrusion 127 of FIG. 13 or 16) corresponding to the assembly section N, and once the guide rail 103 is mounted on the curved surface 102a, the entrance of the friction member 104 into the assembly section N may be suppressed. For example, in a state where the friction member 104a is coupled to the guide rail 103, the guide rail 103 is mounted on the curved surface 102a, and after the guide rail 103 is mounted on the curved case 102, the dummy (e.g., the interfering protrusion 127 of FIG. 16) may limit a moving section of the friction member 104a.

According to various embodiments, the friction member 104a and/or the first fixing member 104b may include a plurality of through-holes. At least one (e.g., the through-hole 143) of the through-holes provides an interconnection path, and for example, a wire or the like is interconnected through the through-hole 143 to connect the cooling fan disposed in the slide housing 102 to the PCB (e.g., the PCB 117 of FIG. 4) embedded in the base housing 101.

According to an embodiment, at least a part of the friction member 104a is exposed onto the base housing 101 through the guide slot (e.g., the first guide slot 131 and the second guide slot 121 of FIG. 1), and the others of the through-holes formed in the guide member 104, e.g., the friction member 104a, face the second fixing member (e.g., the second fixing member 104c of FIG. 1) mounted on the base housing 101. In an embodiment, a screw may be engaged from the inside of the curved case 102a through the friction member 104a (e.g., through at least some of the others of the through-holes). For example, the friction member 104a may be mounted and fixed onto the second fixing member 104c through an engagement member such as a screw, etc. In another embodiment, the second fixing member 104c may be made of a metallic material, e.g., the zinc (Zn) material. In an embodiment, in coupling of the engagement member such as a screw, etc., the first fixing member 104b and the second fixing member 104c, which are made of a metallic material, are directly bound to the engagement member, and the friction member 104a may be fixed between the first fixing member 104b and the second fixing member 104c in a sandwich manner.

Figure 13:
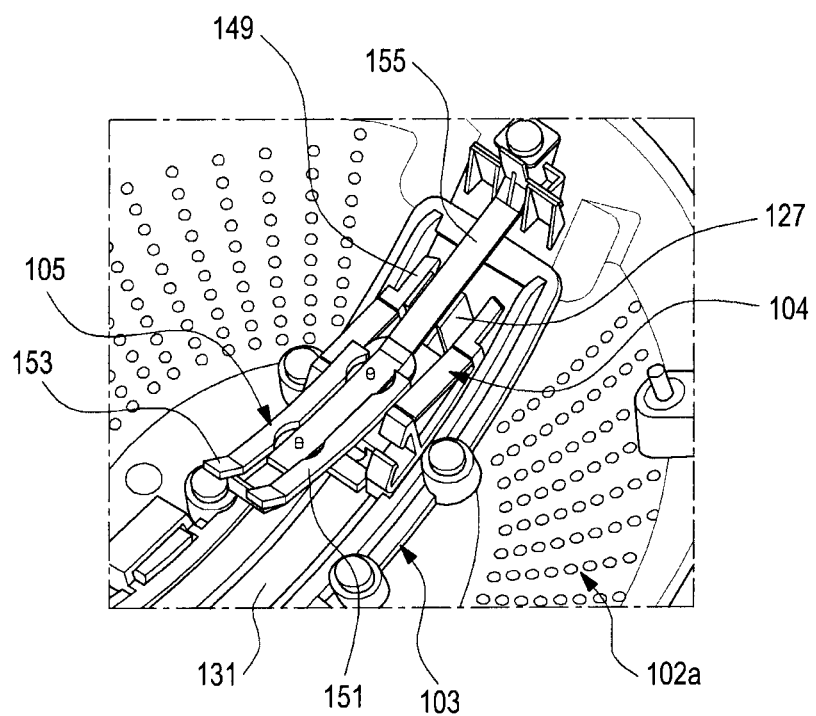
FIG. 13 is a perspective view for describing a cover member of a docking station according to various embodiments of the present disclosure.
Figure 14:
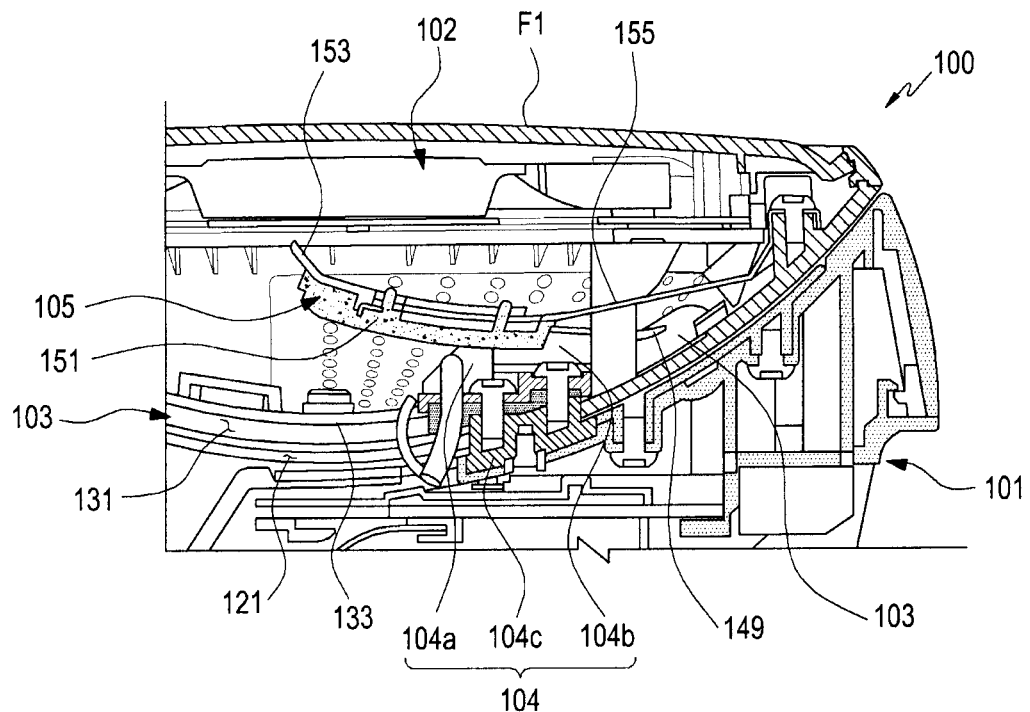
FIG. 14 and FIG. 15 are cross-sectional views for describing a state where a slide housing of a docking station is received in a base housing according to various embodiments of the present disclosure.
Figure 15:
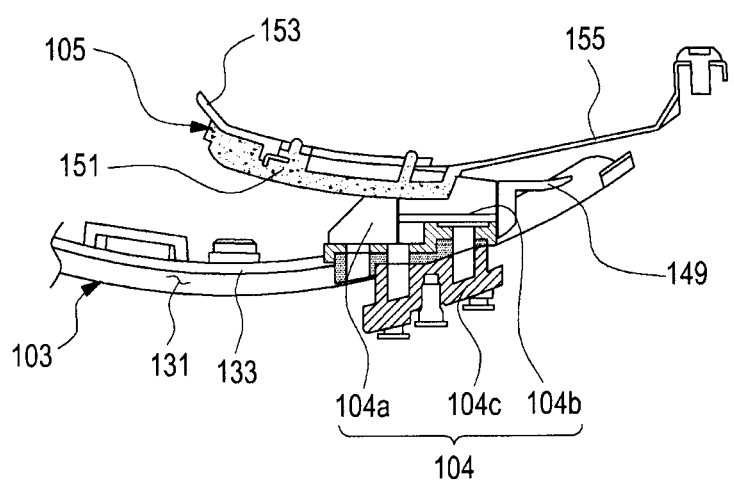

FIG. 13 is a perspective view for describing the cover member 105 of the docking station 100 according to various embodiments of the present disclosure. FIGS. 14 and 15 are cross-sectional views for describing a state where the slide housing 102 of the docking station 100 is received in the base housing 101 according to various embodiments of the present disclosure.

Referring to FIGS. 13 through 15, the cover member 105 according to various embodiments (e.g., the cover member 105 of FIG. 1) may include a cover body 151, a second interfering piece 153, and an elastic member 155, and may be mounted on the slide housing 102 to open and close a part of the first guide slot 131 and/or the second guide slot 121 (e.g., the first guide slot 131 and/or the second guide slot 121 of FIG. 1).

According to various embodiments, the cover body 151 may include a protruding portion (not shown) corresponding to the shape of a partial section of the guide slot (e.g., the first guide slot 131 and/or the second guide slot 121). For example, a part of the cover body 151 may be positioned in the guide slot, such that the cover body 151 may close a part of the guide slot. In an embodiment, the second interfering piece 153 may extend from an end portion of the cover body 151. When the slide housing 102 slides, the second interfering piece 153 interferes with the first interfering piece 149 such that the cover member 105 (e.g., the cover body 151) leaves the guide slot. According to an embodiment, an end of the elastic member 155 is fixed to the cover body 151 and the other end of the elastic member 155 is fixed to the slide housing 102 (e.g., the inner side surface of the curved case 102a), and the elastic member 155 provides an elastic force for moving the cover member 105 (e.g., the cover body 151) in a direction closing a part of the guide slot.

According to various embodiments, in the closed position, the guide member 104 may be positioned to overlap the cover member 105 (e.g., the cover body 151). In an embodiment, in the closed position, the guide member 104 may contact the interfering protrusion 127 formed on the curved case 102a. For example, in the closed position, sliding of the slide housing 102 in a direction toward the opened position may be allowed, but sliding thereof in the opposite direction may be limited. In the closed position, the guide member 104 may cause the cover member 105 to leave a part of the guide slot. In another embodiment, once the slide housing 102 slides toward the opened position, the guide member 104 may gradually leave from the part of the guide slot. In another embodiment, once the guide member 104 completely leaves the part of the guide slot, the cover member 105 may close the part of the guide slot with the cover body 151 by the elastic force of the elastic member 155.

Illustrated in FIGS. 16 to 19 is a state where the cover member 105 closes the part of the guide slot in the opened position.

Figure 16:
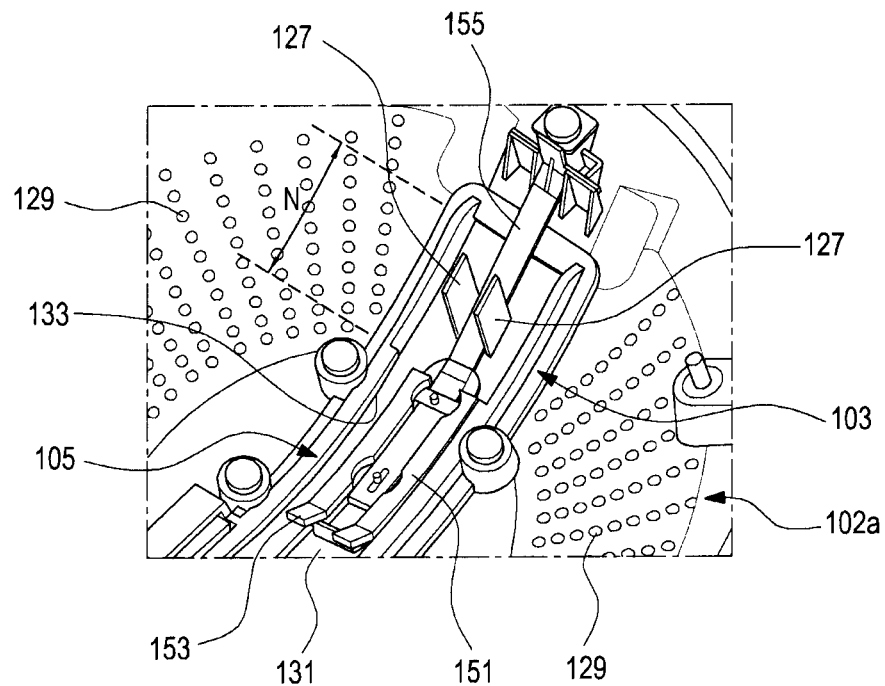
FIG. 16 and FIG. 17 are perspective views showing a state where a cover member of a docking station closes a guide slot according to various embodiments of the present disclosure.
Figure 17:
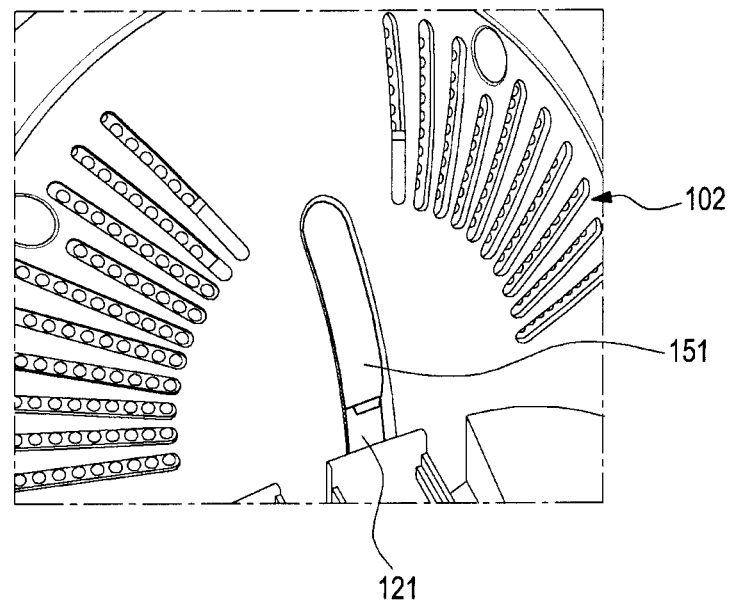
Figure 18:
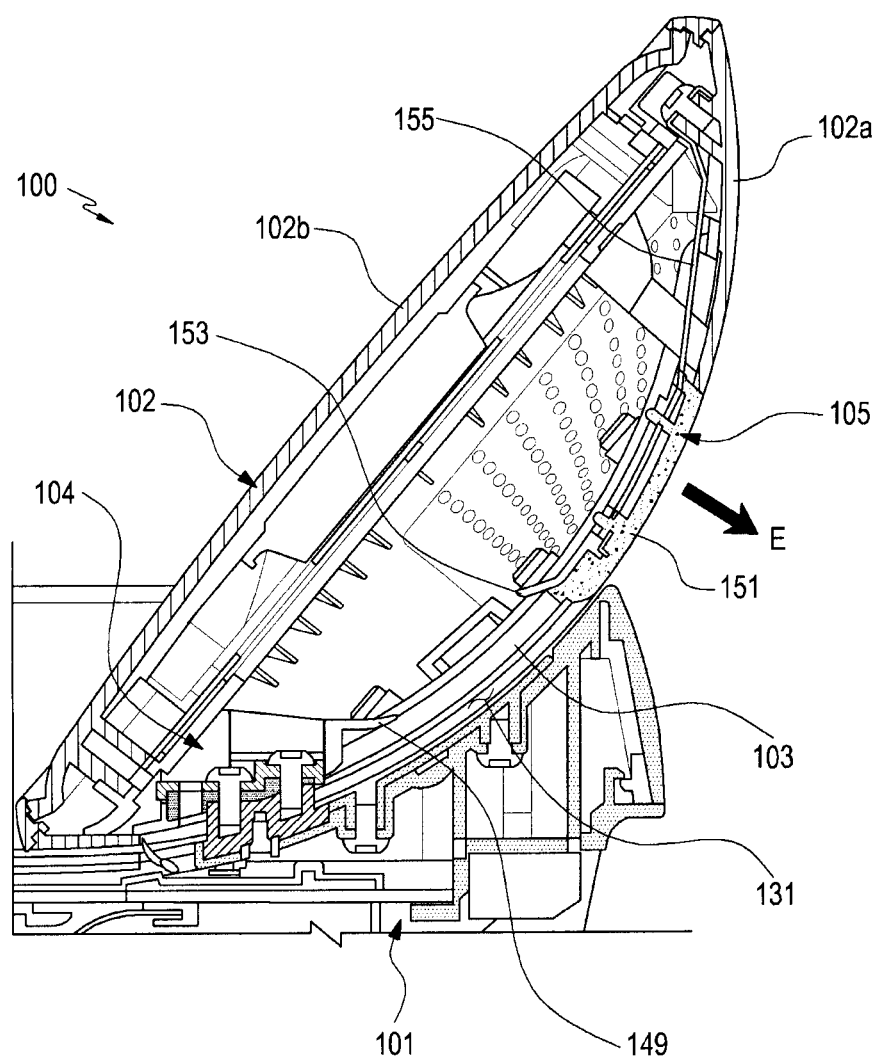
FIG. 18 and FIG. 19 are cross-sectional views for describing a state where a slide housing of a docking station is positioned inclined with respect to a base housing according to various embodiments of the present disclosure.
Figure 19:
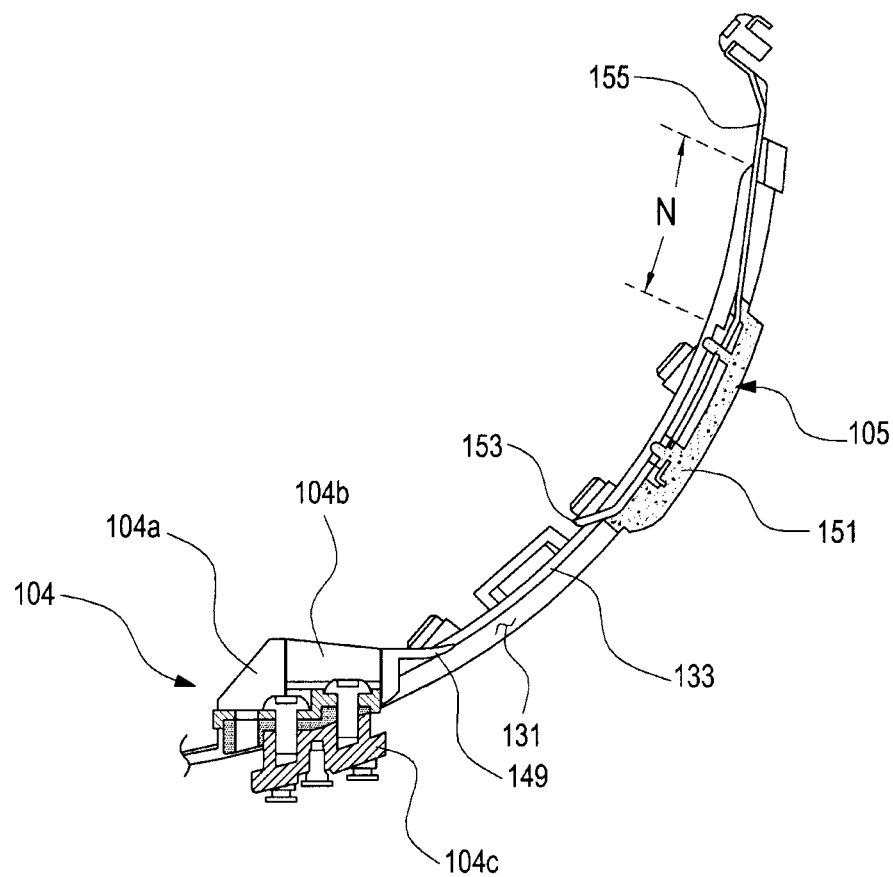

FIGS. 16 and 17 are perspective views showing a state where the cover member 105 of the docking station 100 closes the guide slot according to various embodiments of the present disclosure. FIGS. 18 and 19 are cross-sectional views for describing a state where the slide housing 102 of the docking station 100 is positioned inclined with respect to the base housing 101 according to various embodiments of the present disclosure.

Referring to FIGS. 16 through 19, in the opened position, the guide member 104 completely leaves the part of the guide slot, and the cover member 105 (e.g., the cover body 151) closes the part of the guide slot (e.g., the first guide slot 131 and/or the second guide slot 121) by the elastic force of the elastic member 155. Even in the state where the part of the guide slot is closed, the elastic member 155 provides the elastic force in a direction E urging the cover member 105 to closely contact the inner side surface of the curved case 102a. For example, in the opened position, the cover member 105 may stably maintain the state of closing the part of the guide slot. While it is illustrated in FIG. 17 that the cover member 105 closes the part of the guide slot, but another part of the guide slot is still opened, the opened part of the guide slot may be covered with substantially the base housing 101 in FIG. 17. For example, the part of the guide slot exposed to the outside of the base housing 101 in the opened position may be closed by the cover member 105.

Figure 20:
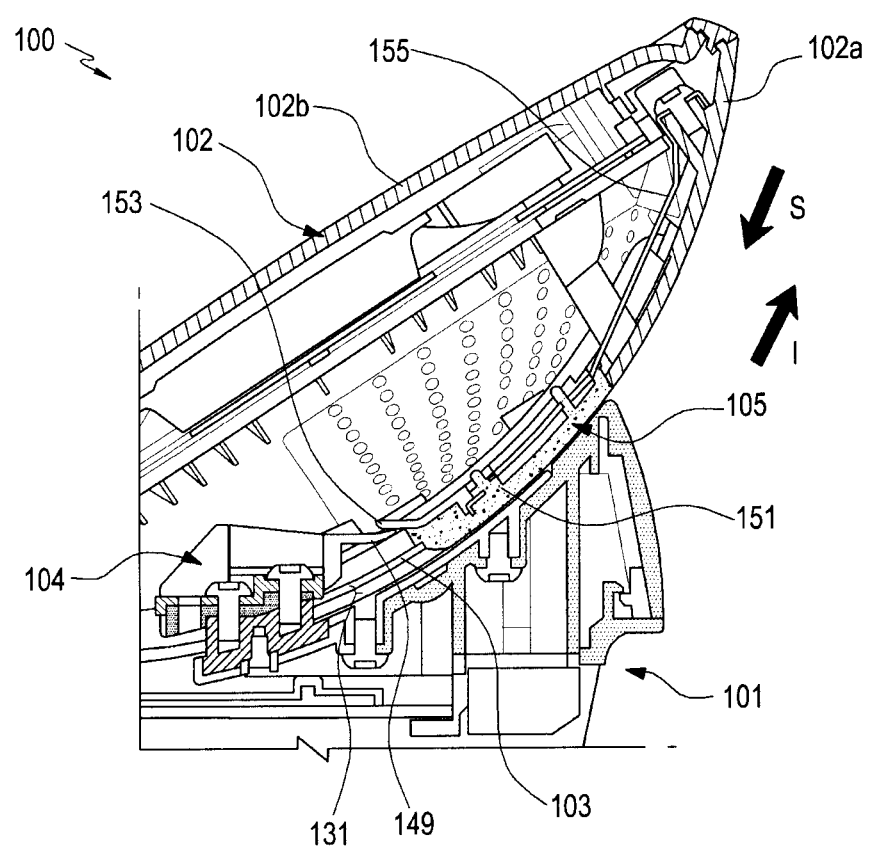
FIG. 20 and FIG. 21 are cross-sectional views for describing sliding of a slide housing of a docking station according to various embodiments of the present disclosure.
Figure 21:
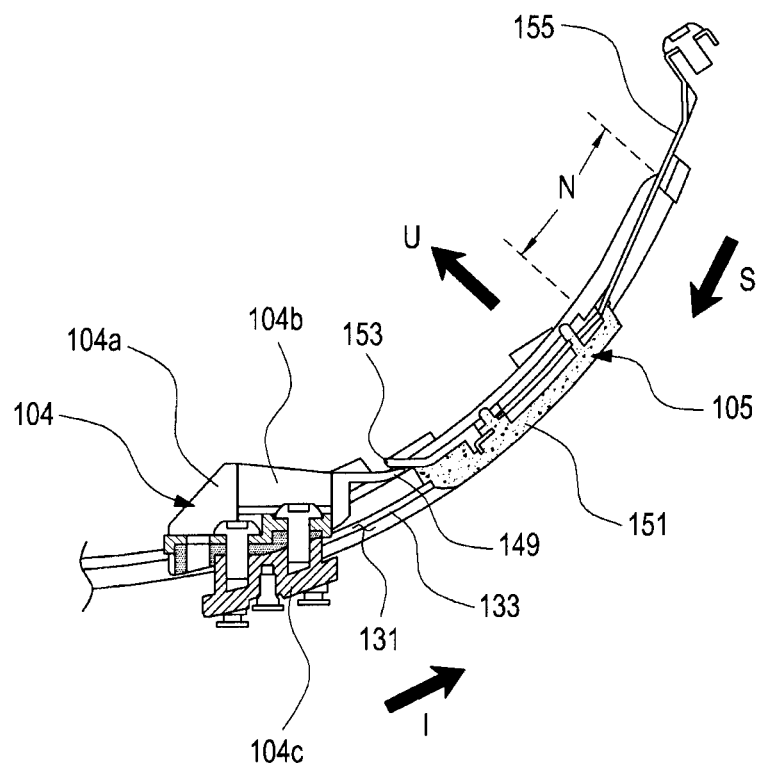

FIGS. 20 and 21 are cross-sectional views for describing sliding of the slide housing 102 of the docking station 100 according to various embodiments of the present disclosure.

According to various embodiments, when the slide housing 102 moves from the closed position to the opened position, the guide member 104 may gradually leave the part of the guide slot while slidably contacting the cover member 105. Once the guide member 104 completely leaves the part of the guide slot, the cover member 105 may close the part of the guide slot.

Referring to FIGS. 20 and 21, when the slide housing 102 moves from the opened position to the closed position in a direction indicated by an arrow S, the guide member 104 may gradually enter the part of the guide lost in a direction indicated by an arrow I. When the guide member 104 enters the part of the guide slot in the direction indicated by the arrow I, the part of the guide member 104, e.g., the first interfering piece 149 sequentially slidably contacts the second interfering piece 153 and the cover body 151, thus causing the cover member 105 to leave the part of the guide slot in a direction indicated by an arrow U. Once the slide housing 102 reaches the opened position, the guide member 104 is positioned in the part of the guide slot and the cover member 105 completely leaves the part of the guide slot. When the slide housing 102 reaches the closed position, the guide member 104 is interfered by the interfering protrusion (e.g., the interfering protrusion 127 of FIG. 13 or 16), and thus is stopped, failing to further move in the direction indicated by the arrow S. In the closed position, the guide slot may not be exposed to the outside by being already positioned in the recessed portion 111.

As described above, the electronic device according to various embodiments of the present disclosure, e.g., the docking station may receive another electronic device (such as a mobile communication device) on the recessed portion formed in the base housing, and may provide an image signal provided from the received electronic device to another external device (e.g., still another electronic device). In an embodiment, the slide housing may be mounted on the recessed portion on which the electronic device is received, so as to at least partially open and close the recessed portion. For example, when another electronic device is not received on the recessed portion, the recessed portion may be closed to hide and protect the connection member (e.g., a male electrical connector). Thus, the slide housing forms a generally global cylindrical shape facilitating packing into a smaller rectangular container. In another embodiment, the slide housing may slide on the base housing along the curved trajectory and may support the received electronic device in a state where the recessed portion is opened. In another embodiment, the slide housing may cool the received electronic device by including the cooling fan, the vent hole, etc. In another embodiment, the slide housing may provide a wireless charging function by including the loop antenna (e.g., a wireless power transmission coil). In an embodiment, the cover member is provided in the slide housing to open and close the guide slot having a through structure that is selectively exposed to the outside. According to various embodiments, the docking station includes various connectors (e.g., a power connector, an HDMI connector, an Ethernet connector, a USB connection, and the like) for receiving various cables, such as a power cable, HDMI cable, Ethernet cable. Thus, the docking station is capable of providing a power source for a received electronic device or facilitating connection with another electronic device, thus allowing use of the received electronic device in various ways.

According to various embodiments of the present disclosure, a docking station includes a base housing including a first surface having a recessed portion formed in at least a region thereof, a second surface directed in an opposite direction to the first surface, and a side surface at least partially surrounding a space between the first surface and the second surface, a slide housing slidably mounted on the recessed portion to open and close at least a part of the recessed portion, and a connection member disposed on the recessed portion, in which as the slide housing slides, the connection member is hidden or exposed, and in a state where a part of the recessed portion is opened, the slide housing is positioned inclined with respect to the first surface or the second surface.

According to various embodiments, the recessed portion may include a cradling recess on which the connection member is disposed, and a receiving recess provided in a side of the cradling recess, the receiving recess including a curved surface that guides sliding of the slide housing.

According to various embodiments, the base housing may include at least one connection hole disposed on the side surface.

According to various embodiments, the connection hole may include at least one of a USB connector, an LAN connector, an HDMI connector, and a power connector.

According to various embodiments, the slide housing may include a curved case disposed to face the recessed portion and sliding along a curved trajectory and a planar case coupled to the curved case, in which as the slide housing slides, the planar case is positioned on the first surface or is positioned inclined with respect to the first surface or the second surface.

According to various embodiments, the docking station may further include at least one of a cooling fan, a loop antenna, and a speaker, disposed between the curved case and the planar case.

According to various embodiments, the slide housing may further include vent holes that are formed on the curved case and the planar case, respectively.

According to various embodiments, the docking station may further include a guide member mounted on the base housing and a guide rail mounted on the slide housing and including a first guide slot formed to have a circular arc trajectory, in which the guide member is slidably coupled to the first guide slot.

According to various embodiments, the slide housing may include a curved case disposed to face the recessed portion and sliding along a curved trajectory and a planar case coupled to the curved case, in which as the slide housing slides, the planar case is positioned on the first surface or is positioned inclined with respect to the first surface or the second surface.

According to various embodiments, the slide housing may include a curved case disposed to face the recessed portion and sliding along a curved trajectory and a planar case coupled to the curved case, and as the slide housing slides, the planar case may be positioned on the first surface or may be positioned inclined with respect to the first surface or the second surface.

According to various embodiments, the docking station may further include a cover member mounted on the slide housing, the cover member opening and closing a part of the first guide slot.

According to various embodiments, in a state where the recessed portion is closed, the guide member may be positioned in the part of the first guide slot to separate the cover member from the first guide slot, and in the state where the part of the recessed portion is opened, the guide member may leave the part of the first guide slot and move to another part of the first guide slot, and the cover member may close the part of the first guide slot.

According to various embodiments, the docking station may further include an elastic member mounted on the slide housing, the elastic member providing an elastic force for moving the cover member in a direction closing the part of the first guide slot.

According to various embodiments, the docking station may further include an interfering piece provided on the cover member, in which when the slide housing moves in a direction closing the recessed portion, the guide member urges the cover member to leave the part of the first guide slot while slidably contacting the interfering piece.

According to various embodiments of the present disclosure, an electronic device includes a base housing including a lower structure, a side structure, and a recessed portion at least partially surrounded by the lower structure and the side structure so as to be opened substantially upwardly, in which a part of the recessed portion has a shape and a size for receiving a part of a first external electronic device including a first connector, a male electrical connector disposed on the recessed portion, and aligned and disposed in a first direction so as to connect to the first connector when the first external electronic device is received in the recessed portion, a slide housing directly or indirectly connected to the base housing and moving between a position in which the recessed portion is closed on the base housing (hereinafter, referred to a 'closed state') and a position in which the part of the recessed portion is opened to support the first external electronic device received in the recessed portion by positioning a surface of the slide housing toward a second direction substantially perpendicular to the first direction (hereinafter, an 'opened state'), a female electrical connector disposed on an external surface of the side structure of the base housing, and a circuit electrically connecting the male electrical connector with the female electrical connector, in which the circuit is configured to provide an image signal, which is received from the first external electronic device through the male electrical connector, to an outside of the electronic device through the female electrical connector.

According to various embodiments, when the slide housing is in the closed state, the slide housing may form a substantially planar top surface.

According to various embodiments, when the slide housing is in the opened state, the planar top surface may face the second direction.

According to various embodiments, the electronic device may further include a guide member mounted on the base housing and a guide rail that is mounted on the slide housing and includes a first guide slot formed to have a circular arc trajectory, in which as the guide member is slidably bound to the first guide slot, the guide member guides sliding of the slide housing between the closed position and the opened position.

According to various embodiments, the male electrical connector may include a USB connector or a USB type C connector.

According to various embodiments, the female electrical connector may include an HDMI connector.

The electronic device, e.g., the docking station according to various embodiments of the present disclosure may prevent contamination or damage of the connection member and may position the slide housing to support the electronic device, thus making it easy to put the electronic device thereon. According to various embodiments, the docking station is easy to carry and has an elegant exterior while being carried.

While detailed embodiments of the present disclosure have been described, it would be obvious to those of ordinary skill in the part that various changes may be made without departing the scope of the present disclosure.

What is claimed is:

1. A docking station comprising:
    a base housing comprising a first upper surface having a recessed portion, a first bottom surface directed in an opposite direction to the first upper surface and adapted to rest on a flat surface, and a side surface at least partially surrounding a space between the first upper surface and the first bottom surface, wherein the recessed portion includes a cradling recess having a second upper surface and a receiving recess having a third upper surface in a shape of a parabola, the second upper surface connected to the third upper surface by a transverse wall;
    a slide housing slidably mounted on the recessed portion to open and close at least a part of the recessed portion, the slide housing including a fourth upper surface and a second bottom surface, wherein the second bottom surface is in the shape of the parabola; and
    a connection member disposed on the cradling recess,
    wherein when the slide housing is slid to be fully closed, the fourth upper surface of the slide housing is parallel to the first bottom surface of the base housing, and
    wherein when the slide housing is slid to be open, the connection member is exposed, the slide housing is positioned inclined with respect to the first upper surface or the first bottom surface, and the fourth upper surface of the slide housing is substantially co-planar with the transverse wall.

2. The docking station of claim 1, wherein the base housing comprises at least one connection hole disposed on the side surface.

3. The docking station of claim 2, wherein the connection hole comprises at least one of a data connector, a network connector, a video connector, and a power connector.

4. The docking station of claim 1, wherein the slide housing comprises:
    a curved case disposed to face the recessed portion and sliding along a curved trajectory; and
    a planar case coupled to the curved case.

5. The docking station of claim 4, further comprising at least one of a cooling fan, a loop antenna, and a speaker, disposed between the curved case and the planar case.

6. The docking station of claim 5, wherein the slide housing further comprises vent holes that are formed on the curved case and the planar case, respectively.

7. The docking station of claim 1, further comprising:
    a guide member mounted on the base housing; and
    a guide rail mounted on the slide housing and comprising a first guide slot formed to have a circular arc trajectory,
    wherein the guide member is slidably coupled to the first guide slot.

8. The docking station of claim 7, wherein the slide housing comprises:
    a curved case disposed to face the recessed portion and sliding along a curved parabolic trajectory; and
    a planar case coupled to the curved case.

9. The docking station of claim 8, wherein the slide housing further comprises a second guide slot formed on the curved case, and the guide rail is mounted on an inner side surface of the curved case in a state where the first guide slot corresponds to the second guide slot.

10. The docking station of claim 7, further comprising a cover member mounted on the slide housing, the cover member opening and closing a part of the first guide slot.

11. The docking station of claim 10, wherein in a state where the recessed portion is closed, the guide member is positioned in the part of the first guide slot to separate the cover member from the first guide slot, and
    in the state where the at least the part of the recessed portion is opened, the guide member leaves the part of the first guide slot and moves to another part of the first guide slot, and the cover member closes the part of the first guide slot.

12. The docking station of claim 10, further comprising an elastic member mounted on the slide housing, the elastic member providing an elastic force for moving the cover member in a direction closing the part of the first guide slot.

13. The docking station of claim 10, further comprising an interfering piece provided on the cover member,
    wherein when the slide housing moves in a direction closing the recessed portion, the guide member urges the cover member to leave the part of the first guide slot while slidably contacting the interfering piece.

* * * * *